L. BICKFORD.

Seed-Dropper.

Patented Mar. 19, 1867.

L. BICKFORD.
Seed-Dropper.
No. 63,001. Patented Mar. 19, 1867.
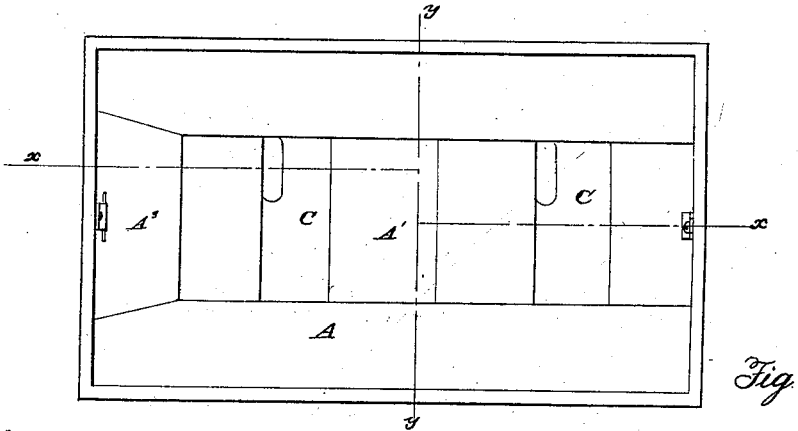
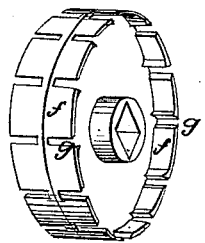
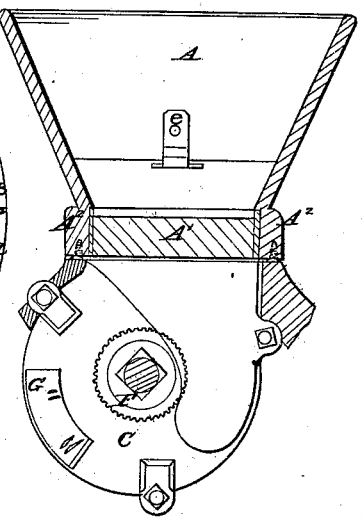
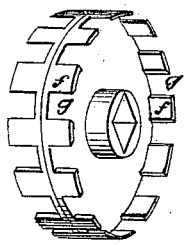
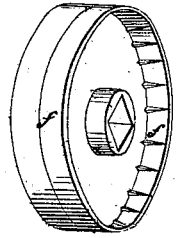

United States Patent Office.

LYMAN BICKFORD, OF MACEDON, NEW YORK.

Letters Patent No. 63,001, dated March 19, 1867.

---

IMPROVEMENT IN GRAIN DRILLS.

---

The Schedule referred to in these Letters Patent and making part of the same.

---

TO ALL WHOM IT MAY CONCERN:

Be it known that I, LYMAN BICKFORD, of Macedon, Wayne county, and State of New York, have invented a new and useful Improvement in Grain Drills; and I do hereby declare that the following is a full, clear, and exact description of the construction and operation of the same, reference being had to the annexed drawings, making a part of this specification, in which—

Figure 3 is a plan or top view.

Figure 4 is a transverse section in line $y\ y$, fig. 3.

Figure 5 is an isometrical view of the grain-distributing wheel; and

Figures 6, 7, and 8 show modifications of the grain-wheel, hereinafter explained.

Similar letters of reference, wherever they are used, indicate like parts in all the figures.

My invention relates to a novel construction of the grain-distributing wheels, whereby they are adapted to the discharge or delivery of large and small grain or seed through runs located upon their opposite vertical sides; to the construction and manner of applying the casings of said wheels; and to the employment of a slide or slides for closing the run or delivery openings upon one side of the distributing-wheel, and simultaneously opening that upon the opposite side, as hereinafter explained.

To enable others to make and use my invention, I will describe, with reference to the drawings, how the same may be carried out in practice.

In said drawings, A represents the grain box, which may be made with flaring sides, or in any usual manner, and $A^1$ is a sliding bottom to said grain box, which, in this instance, is made up of a series of small hoppers, and the whole arranged to slide endwise, for the purpose of changing the delivery of the grain from one to the other of the two series of seed runs hereinafter described.

B is one of a series of distributing-wheels, of which there may be any desired or usual number, placed side by side, and C C are the casings of said wheel, which are provided with top flanges, by which, through bolts or screws, they are secured to the bottom of the grain box in the usual manner. The wheel B is provided with an enlarged hub or centre, B', which has a square or other suitable form of opening through it, to receive and cause it to turn with the shaft D. The face $a$ of the hub or enlarged centre is connected to the vertical face $b$ of the distributing-wheel by a curved receding face $c$, (see fig. 4;) or, instead of being curved, the junction of the vertical faces $a$ and $b$ of the wheel may be made by an angular or inclined face forming right or obtuse angles with said vertical faces. At the junction of said curved face $c$ with the vertical face $a$ on the hub or centre is a series of projecting ribs or "starts," which are arranged in a circle around said hub or centre; and at the junction of the curved or angular face $c$ with the vertical face $b$ on the wheel, and near the periphery thereof, is another series of starts or ribs, $d'$. These starts or ribs, from their connection to and projection from the vertical faces of the wheel, and in contradistinction to those formed upon the horizontal rim or flange of the wheel, as shown in figs. 6 and 7, I term vertical ribs or starts.

Figure 1:
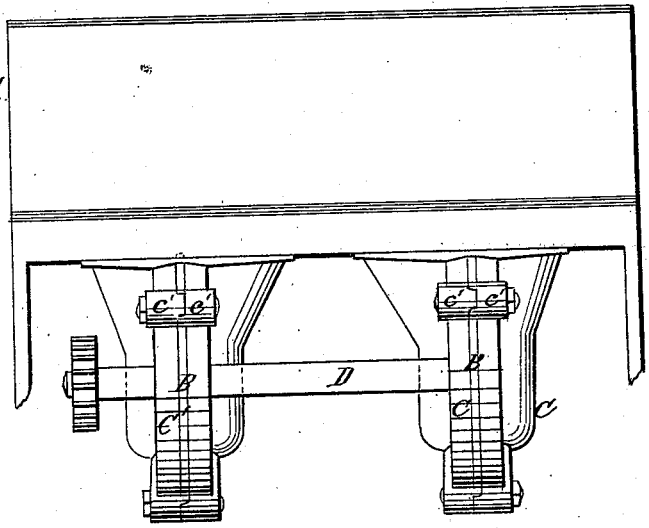
Figure 1 is a rear elevation of so much of a grain drill as is necessary to illustrate my improvement.

The casings C are formed with curved funnel-shaped openings E, through which the grain or seed passes from the grain box A to the side or face of the distributing-wheel; and with the central circular openings F, which form bearings for the distributing-wheel, in the manner shown by the drawings. C' C' are external flanges, formed on the casings C, which are made to conform in shape to the periphery of the wheel, and are of a corresponding diameter with said wheel, so that, when combined therewith, the external faces of said flanges shall be flush with the periphery of the wheel, as shown in figs. 1 and 2; or, instead of being made flush, as shown and described, the casings may be slightly enlarged, and the flanges extended so as to meet outside the wheel in such manner as that the periphery of the wheel shall revolve in close proximity thereto.

G are elongated openings or slots in the sides of the casings and near the outside thereof, as shown in fig. 4, forming discharge or delivery outlets, through which the grain is delivered, and from which it is conducted to the desired point of deposit upon the ground, by means of drill teeth constructed in any usual manner. $c'\ c'$ are perforated lugs or ears formed upon the casings, through which, by means of bolts or rivets, the casings are securely fastened to each other at points outside the periphery of the enclosed wheel. These lugs are provided with interlocking teeth or faces, which, when the opposite parts of the casings are secured to each other in the manner shown in fig. 1, interlock, and thereby prevent any movement or variation of said parts with relation to each other; and consequently the wheel, which has its bearings therein, is always maintained in its proper working relation thereto.

The opposite vertical faces or sides of each wheel, and the casings upon such opposite sides, as will be seen from the drawing, (fig. 2,) are of similar construction, except that the hub or enlarged centre $a$ of the wheel is larger, and the vertical ribs or starts are smaller, upon one side than upon the other, and consequently said hub approaches nearer to the flange upon the casing, and thereby diminishes the size of the opening or run $i'$, through which the grain is conducted from the grain box to the discharge opening G. $k$ is a partition or dividing piece, secured between the tops of the casings; said dividing piece, upon its under face, conforms to that portion of the periphery of the wheel between the front and rear boards of the grain box, and extends up to and conforms upon its upper face to the bottom of the slide $A^1$, thereby effecting a separation of the runs upon the opposite sides of the wheel from each other. The slide $A^1$ is placed upon the tops of the distributors, resting thereon, between said distributors and the bottom edges of the front and rear boards of the grain box, by which the slide is held down in place. The slide is further made to fill or nearly fill the space between the longitudinal bars $A^2 A^2$, to which the distributors are fastened, as shown at fig. 4 of the drawing. $A^3$ is a block, which is made to fit between the end of the slide and the end of the grain box, to which it is applied, and serves, by means of the cleat or rebate upon its under face, to hold the slide in place, and also to close the end of the grain box, otherwise opened by the withdrawal of the slide therefrom. It also serves, by means of its inclined upper face, to prevent the lodgment of grain in the end of the grain box. The slide is designed to close the run upon one side of the distributing-wheel, and to open and direct the grain to that upon the other side thereof, and may be made so as to work over the entire series of distributors, opening those on one side of the series of wheels and simultaneously closing those upon the other sides thereof, as shown by the drawing; or separate slides may be used for each distributor, as may be found desirable.

Figure 2:
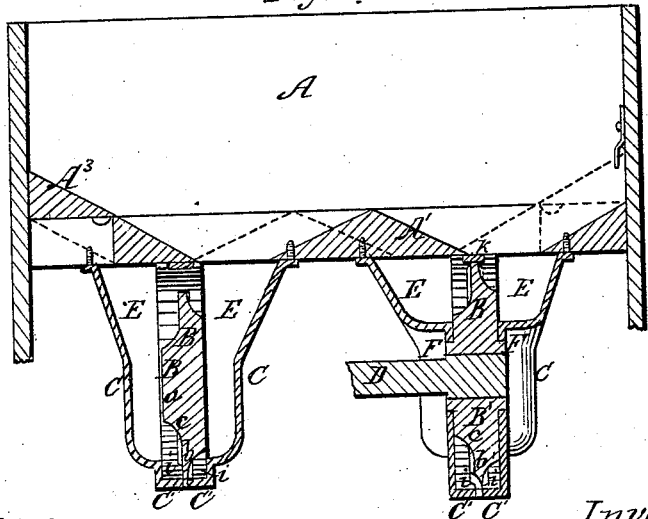
Figure 2 is a longitudinal section thereof through the grain box, taken in line $x\ x$, fig. 3.

The block by which the slide is held in place is made removable, and may be transferred from one end of the grain box and slide to the other in the manner shown in red lines, fig. 2, when the slide is adjusted to change the delivery opening to adapt the machine to the different kinds of grain to be sown. The block is held in place by means of a button, $c$, or other suitable fastening for the purpose.

By the construction and arrangement of parts hereinabove described it will be seen that the grain, entering at the opening or mouth of the funnel-shaped casing, passes down upon that side of the wheel to which it is directed, by the previous adjustment of the slide or slides, into contact with the curved or receding face $c$ and vertical face $b$ thereof, and is carried foward by the rotation of the wheel and by the vertical starts or ribs formed thereon, to the discharge openings G. The flaring or curved face of the enlarged hub tends continually to crowd the grain outward, and serves to prevent any lodgment of the grain upon the wheel when the delivery opening is reached, and the starts or ribs serve effectually to prevent any packing or lodgment of the grain in the mouth of the casing, and enforce a regular and constant delivery of the grain from the grain box.

By the peculiar construction of the grain-wheel any foreign substance, such as sticks, straws, and even nails, which are frequently found in grain, will be ground, crushed, or broken up, and forced forward through the runs, and out therefrom through the delivery openings. By the arrangement of the two runs, of different sizes, upon opposite sides of the wheels, the machine is adapted to perform with the utmost accuracy the work required of it, and which is impracticable where but one run is used for sowing all the different sizes of grain. The smaller run $i'$ is especially adapted to the smaller and heavier grain, such as wheat, while the larger one is adapted to lighter and larger grain, such as oats, corn, &c.

Figs. 6, 7, and 8 are given to show the manner in which wheels of different construction to that above described may be adapted to deliver grain upon their opposite sides.

In fig. 6 the wheel is provided with a continuous double or T-shaped flange, $f$, upon which the grain is carried forward to the delivery opening. In this construction of the wheel the flanges upon the casings may be dispensed with, and side covers resting against the flanges on the wheel, and provided with lugs, through which they are fastened to each other in the manner above explained, may be used.

In fig. 7 the flanges, instead of being made continuous, are made up of broad teeth with narrow intervening spaces. If the flanges on the casings are dispensed with, these spaces should be so narrow as not to permit the escape of the grain between the teeth, said spaces in this construction merely serving the purpose of "starts" for forcing the grain forward with the rotation of the wheel. Where the teeth are made narrower and the intervening spaces broader, as in fig. 8, the flanges on the casings are necessary, and the teeth themselves act as "starts," by which the grain is moved forward over the stationary flanges of the casings.

The parts of the machine not herein shown and described may be constructed in any usual manner.

Having now described one good, practical way in which my invention may be carried out in practice, what I claim as new, and of my invention, is—

1. The construction of the distributing-wheel, whereby it is adapted to the discharge or delivery of grain upon its opposite vertical sides or faces, for the purpose specified.

2. The distributing-wheel, provided with the enlarged hub or centre, and with curved or angular sides or faces, substantially as described.

3. The starting ribs, formed upon the curved or angular sides or faces of the vertical distributing-wheel, substantially as and for the purpose described.

4. The casings upon the opposite sides of and in combination with a double distributing-wheel, adapted to the delivery of grain upon its opposite vertical sides, substantially as described.

5. Providing the lugs or ears, through which the casings of the distributing-wheel are fastened to each other, with the interlocking faces, substantially as described.

6. The casings of the distributing-wheel, provided with the external flanges, and with the side delivery or discharge opening, substantially as described.

7. The employment of the casings, provided with the external flanges and side-delivery openings, in combination with the vertical starting ribs or teeth on the side of the distributing-wheel, substantially as described.

8. The employment of a slide, in combination with the double distributing-wheel, for closing the seed run upon one side or face thereof, and simultaneously opening that upon the opposite side or face, substantially as described.

9. The adjustable block, or its equivalent, at the end of the grain box, in combination with the slide, substantially as and for the purpose described.

In testimony whereof I have hereunto set my hand this eighteenth day of February, 1867.

LYMAN BICKFORD.

Witnesses.
 EDM. F. BROWN,
 CHRIS. JOURGENSEN.